(12) United States Patent
Friestad et al.

(10) Patent No.: US 7,497,175 B2
(45) Date of Patent: Mar. 3, 2009

(54) SEED SINGULATOR ADJUSTER FOR A SEED METER

(75) Inventors: Michael Eric Friestad, Rock Island, IL (US); Nathan Albert Mariman, Mahomet, IL (US)

(73) Assignee: Deere & Company, Moline, IL (US)

( * ) Notice: Subject to any disclaimer, the term of this patent is extended or adjusted under 35 U.S.C. 154(b) by 301 days.

(21) Appl. No.: 11/554,915

(22) Filed: Oct. 31, 2006

(65) Prior Publication Data

US 2008/0110383 A1      May 15, 2008

(51) Int. Cl.
*A01C 7/00* (2006.01)
*A01C 9/00* (2006.01)

(52) U.S. Cl. .................. 111/185; 221/211; 74/813 L; 74/117; 74/119; 74/522; 74/525; 74/570.1

(58) Field of Classification Search .............. 74/10.9, 74/813 L, 111, 112, 116–199, 519, 522, 523, 74/525, 570.1; 111/170, 177–185; 221/211
See application file for complete search history.

(56) References Cited

U.S. PATENT DOCUMENTS

| | | | |
|---|---|---|---|
| 3,990,606 A | 11/1976 | Gugenhan | |
| 4,449,642 A | 5/1984 | Dooley | |
| 5,325,801 A | 7/1994 | Fiorido | |
| 6,347,595 B1 | 2/2002 | de Morais | |
| 6,758,153 B1 | 7/2004 | Hagen et al. | ................. 111/185 |
| 2003/0183647 A1 | 10/2003 | Ven Huizen | |
| 2005/0150442 A1 | 7/2005 | Friesen | |

FOREIGN PATENT DOCUMENTS

FR      2333430      7/1977

*Primary Examiner*—Christopher J. Novosad
(74) *Attorney, Agent, or Firm*—Taylor & Aust, P.C.

(57) ABSTRACT

An adjustment mechanism for setting the position of a singulator in a seed meter. The singulator comprises an arm pivotally mounted about a pivot adjacent a seed disk. A shaft with an eccentric connection to a radially outward portion of the arm has a lever pivotally connected on it. The lever has a cam mechanism to displace an actuating sleeve into a resilient sleeve to lock the shaft in a given position when the lever is extending in the direction of the axis of rotation of the shaft. When the lever is moved to a right angle orientation the shaft is free to pivot and thus set the position of the arm.

39 Claims, 6 Drawing Sheets

SEED SINGULATOR ADJUSTER FOR A SEED METER

FIELD OF THE INVENTION

The present invention relates to agricultural seeding machines, and, more particularly, to seed metering systems used to meter seeds for placement in a seed trench.

BACKGROUND OF THE INVENTION

An agricultural seeding machine such as a row crop planter or grain drill places seeds at a desired depth within a plurality of parallel seed trenches formed in soil. In the case of a row crop planter, a plurality of row crop units are typically ground driven using wheels, shafts, sprockets, transfer cases, chains and the like. Each row crop unit has a frame which is moveably coupled with a tool bar. The frame may carry a main seed hopper, herbicide hopper and insecticide hopper. If a granular herbicide and insecticide are used, the metering mechanisms associated with dispensing the granular product into the seed trench are relatively simple. On the other hand, the mechanisms necessary to properly meter the seeds, dispense the seeds at a predetermined rate and place the seeds at predetermined relative locations within the seed trench are relatively complicated.

The mechanisms associated with metering and placing the seeds generally can be divided into a seed metering system and a seed placement system which are in communication with each other. The seed metering system receives the seeds in a bulk manner from the seed hopper carried by the frame. Different types of seed metering systems may be used such as seed plates, finger plates, and seed disks. In the case of a seed disk metering system, a seed disk is formed with a plurality of seed cells spaced about the periphery thereof. Seeds are moved into the seed cells, with one or more seeds in each seed cell depending upon the size and configuration of the seed cell. A vacuum or positive pressure air may be used in conjunction with the seed disk to assist in movement of the seeds into the seed cells. The seeds are singulated and discharged at a predetermined rate to the seed placement system.

The seed placement system may be categorized as a gravity drop system or a power drop system. In the case of a gravity drop system, a seed tube has an inlet end which is positioned below the seed metering system. The singulated seeds from the seed metering system merely drop into the seed tube and fall via gravitational force from a discharge end thereof into the seed trench. The seed tube may be curved in a rearward manner to assist in directing seed into the seed trench. The rearward curvature also assists in reducing bouncing of the seeds back and forth within the tube as it falls into the seed trench. Further, the rearward curvature reduces bouncing of the seed as it strikes the bottom of the seed trench.

A seed placement system of the power drop variety generally can be classified as a seed conveyor belt drop, rotary valve drop, chain drop or air drop. These types of seed placement systems provide more consistent placement of the seeds along a predetermined path at a desired spacing.

Certain seed types, notably flat corn seed with insecticide or other treatments, are difficult for vacuum meters to singulate. Poor singulation of difficult seed types is characterized by doubles, skips, and bunches of seed carried by the disk. Doubles and skips refer to multiple seeds and no seed respectively in each seed cell. Bunches are multiple seeds carried up by the seed pool accelerators which protrude from the surface of the seed disk. These seed types generally are best planted with a flat seed disk in combination with double eliminator. Compared to a celled disk, a flat disk has less favorable seed trajectory into the seed tube, generally requires more vacuum, and a production "double eliminator" adjustment is difficult.

What is needed in the art is an agricultural seeding machine having an accurate positive and efficient adjustment of a double eliminator or singulator mechanism.

SUMMARY OF THE INVENTION

The invention includes an apparatus for setting the position of an arm pivotally mounted about a pivot for knocking off extra seeds from a seed metering disk. The apparatus has an arm mounted for pivotal movement and a shaft having an eccentric connection to a location on the arm radially spaced from the pivot point so that rotational displacement of the shaft causes the arm to pivot about the pivot point. A lever is pivotally mounted to the shaft about an axis approximately at a right angle to the longitudinal axis of the shaft. An element contacts the shaft and is connected to the lever, the lever being pivotal between first and second positions, the first permitting rotational displacement of the shaft and the second position preventing rotational displacement.

In another form, the invention includes a seeding machine having at least one seed metering system, each seed metering system including a housing and a seed disk disposed within the housing, the seed disk having a rotational axis and a plurality of seed cells defining a generally circular path. An arm is pivotally mounted on the housing about an axis generally parallel to the rotational axis of the seed dish and is positioned adjacent the seed cells. The shaft is journaled about an axis generally parallel to the rotational axis of the seed disk, the shaft having an eccentric connection to the arm at a location spaced from the pivotal axis of the arm. A lever is pivotally mounted to the shaft about an axis approximately at a right angle to the longitudinal axis of the shaft. An element contacts the shaft and is connected to the lever. The lever is pivoted between first and second positions, the first permitting rotational displacement of said shaft by said element and the second position preventing rotational displacement of said shaft by said element.

DETAILED DESCRIPTION OF THE INVENTION

Figure 1:
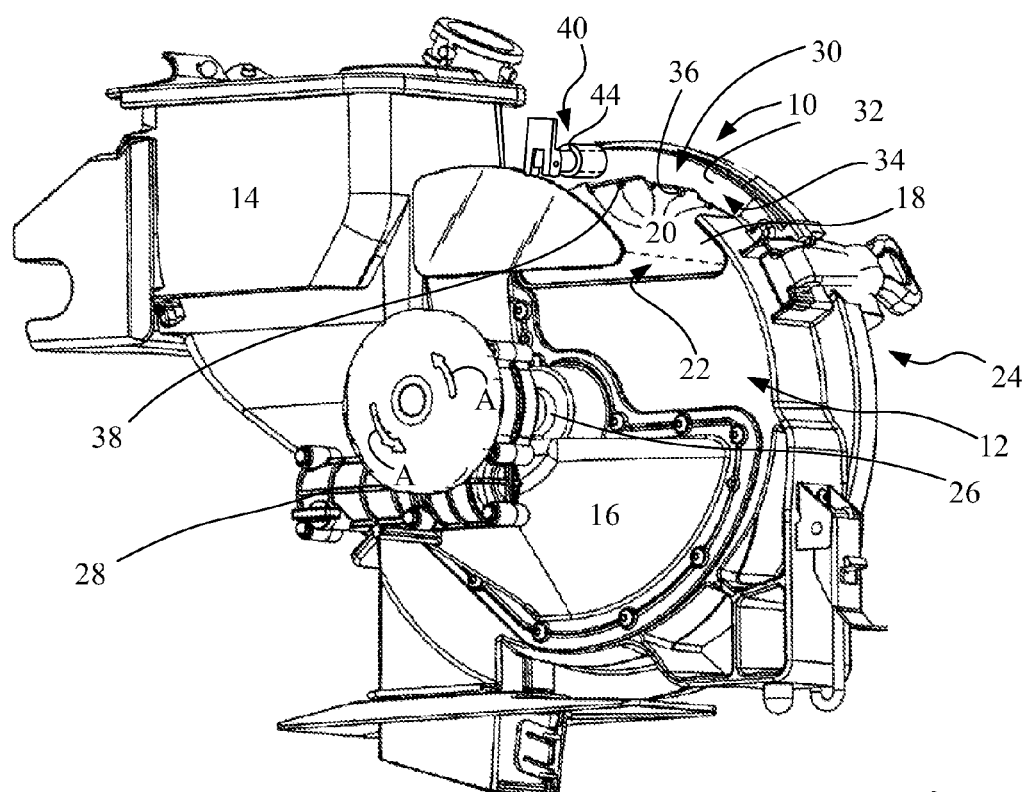
FIG. 1 is a perspective view of a seed metering unit incorporating a singulator adjustment device embodying the present invention.

Referring to FIG. 1, a seed meter, generally indicated by reference character 10, is incorporated in a seeding machine (not shown). The seeding machine has many additional features such as a main hopper or seed air pump to deliver seed to individual seed meters of which unit 10 is one of multiple units. Details of such an overall system may be found in U.S. Pat. No. 6,758,153, of common assignment with this invention, the disclosure of which is hereby incorporated in its entirety. The seed meter 10 includes a housing 12 and a seed hopper 14 which receives an appropriate supply of seeds from a main hopper (not shown). Seed hopper 14 delivers seeds to a chamber in a housing 16 at the lower portion of housing 12. A seed disk 18 is journaled in housing 12 and has a seed side 22 exposed to chamber 16 and a lower pressure side 24 exposed to a vacuum source for maintaining a pressure differential across seed disk 18. Seed disk 18 has a plurality of seed cells 20 positioned in a circular fashion around seed disk 18. Seed cells 20 may take many different forms, but in the illustrated form they are apertures extending through seed disk 18 to connect the seed side 22 to the lower pressure side 24. It should be understood by those skilled in the art that the pressure levels of sides 22 and 24 may be reversed.

Seed disk 18 is journaled on shaft 26 which is driven by an appropriate motor 28 through a gear mechanism (not shown) to turn the seed disk 18 in the direction of arrows A. The seeds that have accumulated against the bottom of seed disk 18 then find their way to the seed cells by virtue of the pressure differential across the seed disk. As the disk turns in a counterclockwise fashion, as shown in FIG. 1, the seeds that are in the seed cells are retained one at a time. The rotation of the disk takes the individual seeds to a segment (not shown) where the pressure differential is locally interrupted so that the seed may be discharged into an appropriate planting mechanism.

Because of the variability of the shape and size of seeds, double seeds may be retained within the seed cells. To eliminate this condition, a singulator, generally indicated by reference character 30, is provided. Although this component may be referred to as a singulator it is also described in the art as a "double eliminator". The singulator 30 includes an arm 32 pivotally mounted to housing at screw 34 and positioned adjacent the path of the seed cells 20. The arm 32 has a plurality of ramps 36 and 38 to knock off double seeds that have been somehow retained or lodged in the seed cells 20. Arm 32 is generally arcuate in shape and has an adjustment mechanism, generally indicated by reference character 40, at an end radially spaced from pivot screw 34. The purpose of mechanism 40 is to cause the singulator 30 to pivot about pivot screw 34 and accommodate seeds of different varieties and grades to provide the most effective elimination of double seeds. The adjustment mechanism 40 is operator manipulated in accordance with the present invention.

Figure 2:
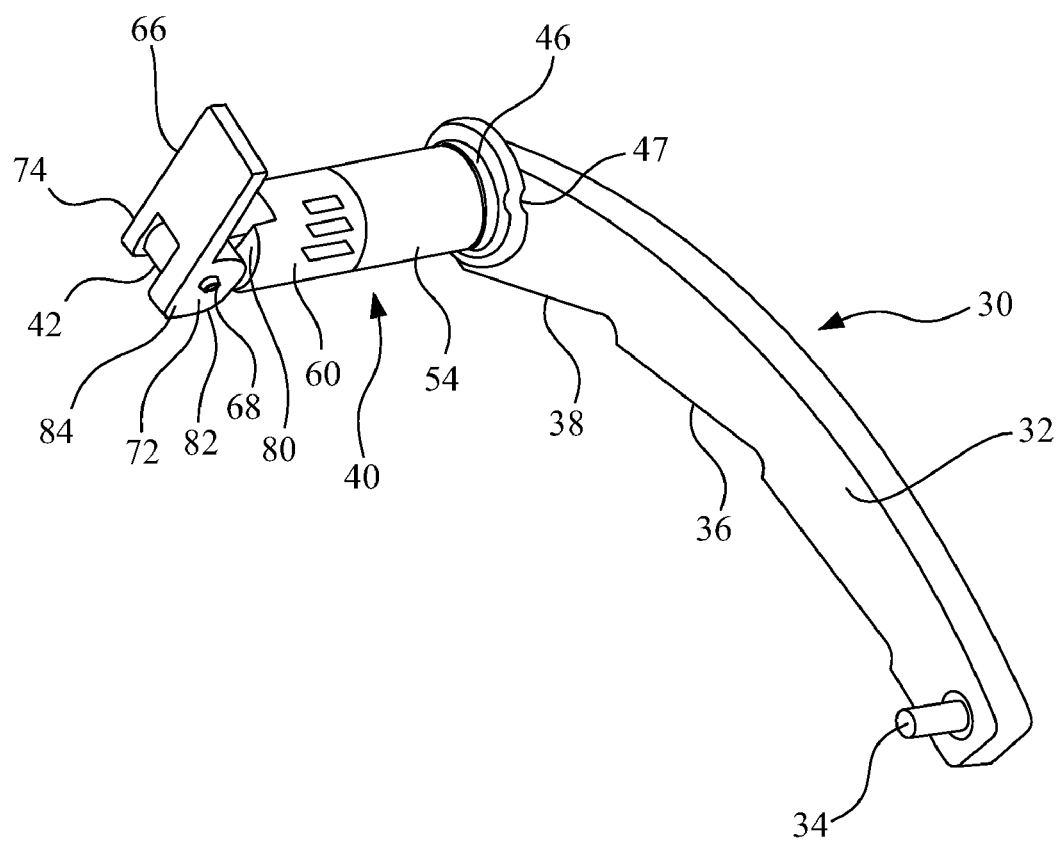
FIG. 2 is a perspective view of the singulator adjustment shown in FIG. 2.
Figure 3:
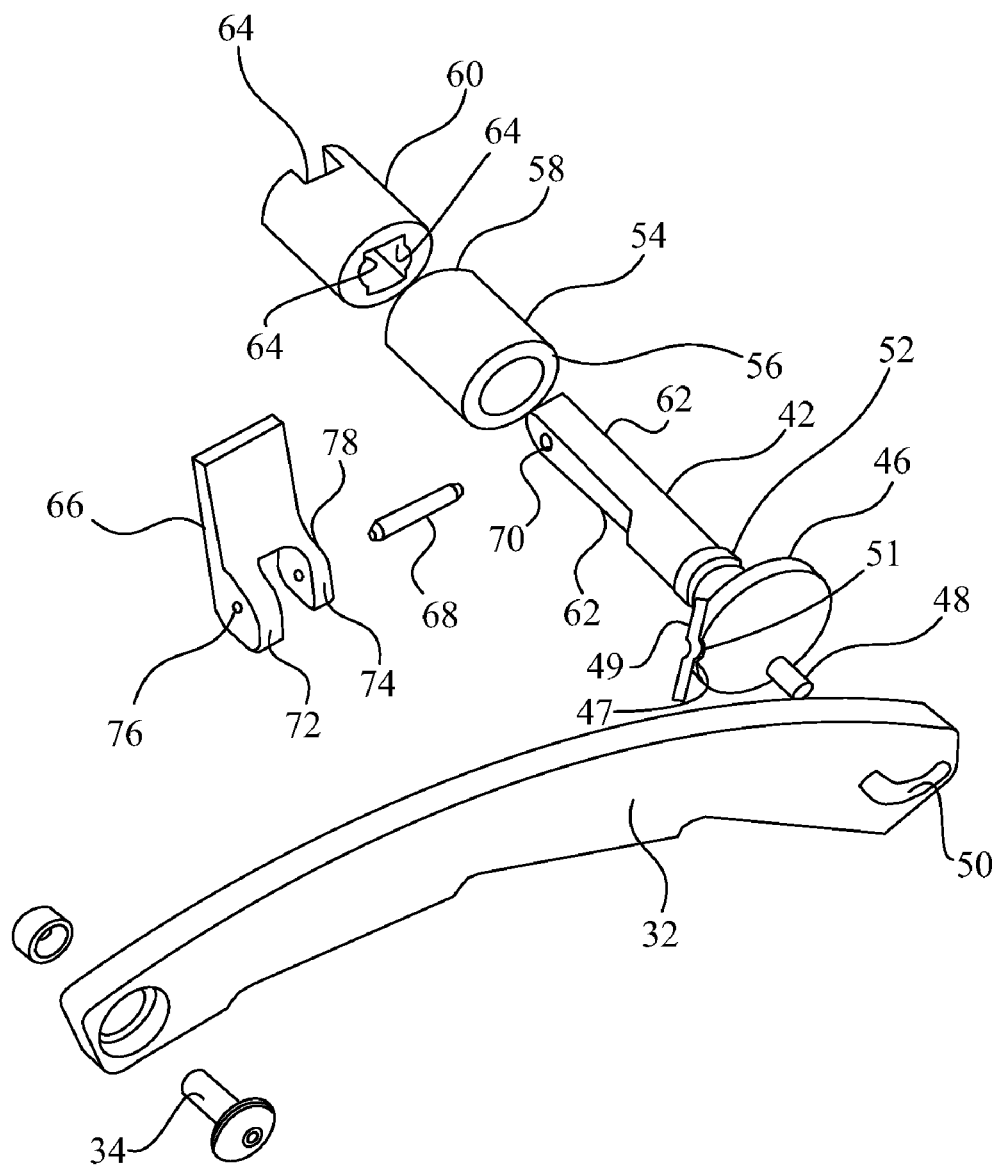
FIG. 3 is an exploded perspective view of the singulator adjustment device of FIGS. 1 and 2.
Figure 4:
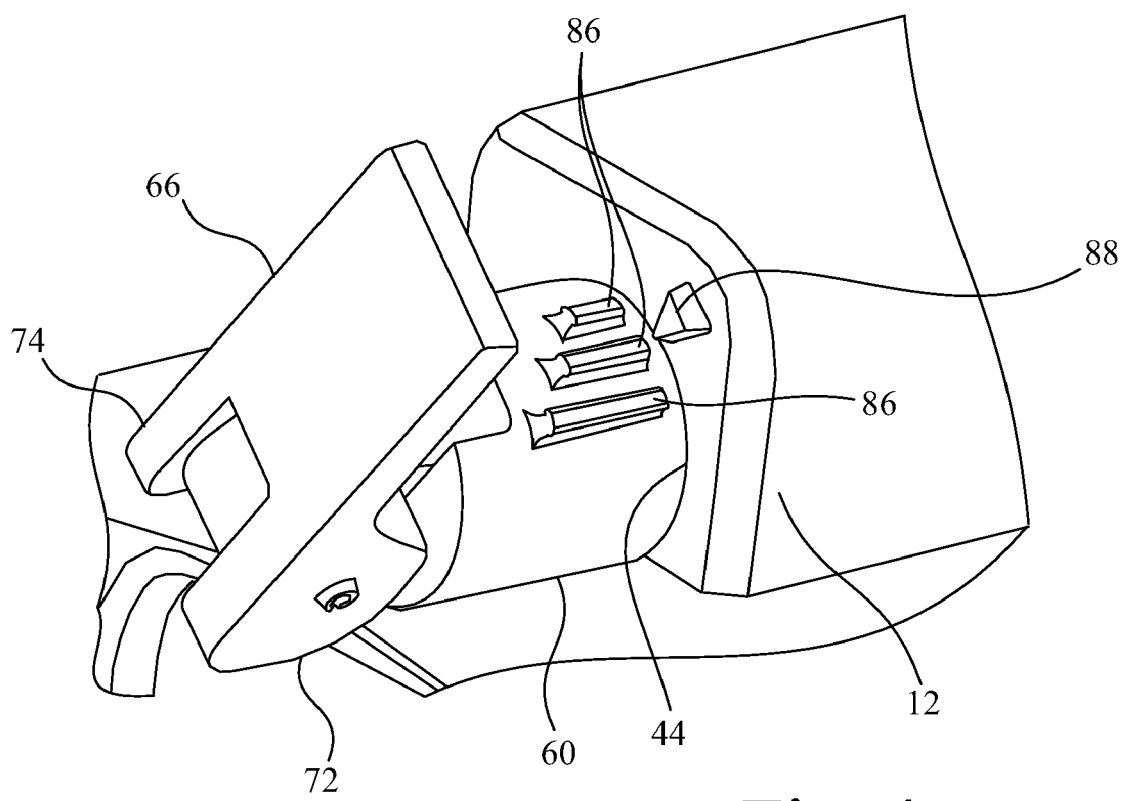
FIG. 4 is a highly expanded fragmentary view of a portion of the singulator device of FIGS. 1-3.

As shown in FIGS. 2-4, the adjustment mechanism 40 includes a central shaft 42 journaled in a bore 44 in housing 12. Shaft 42 has an integral flange 46 with an eccentric pin 48 received in a slot 50 in arm 32. Consequently, rotational displacement of shaft 42 causes the pin 48 to move within slot 50 and cause arm 32 to pivot about its pivot screw 34. Shaft 42 receives a sleeve 54 that abuts flange 46 at end 56. The outer diameter of sleeve 54 also abuts the interior diameter of bore 44. Sleeve 54 is elastomeric so that it may be deformed. An annular ridge 52 on shaft 42 deforms the sleeve 54 slightly so that some drag is placed on the mechanism during the adjustment process. The opposite end 58 of sleeve 54 abuts an actuating sleeve 60, also received on shaft 42.

As noted especially in FIGS. 3, shaft 42 has flats 62 extending longitudinally. The flats 62 on shaft 42 match flats 64 on the interior wall of sleeve 60 so that sleeve 60 is non-rotatable relative to shaft 62, although sleeve 60 can move axially. A lever 66 is pivotally mounted on shaft 42 by means of a pin 68 passing through a hole 70 in shaft 42. Pin 68 is approximately at right angles to the flat 62 which in turn is parallel to the axis of rotation of shaft 42. Lever 66 has a pair of base elements 72 and 74 which are received on opposite sides of shaft 42 adjacent hole 70. Base elements 72 and 74 have aligned holes 76 and 78 which receive and fix pin 68 in appropriate fashion. As especially evident in FIG. 3, the flats 62 and 64 are asymmetric with respect to the rotational axis of shaft 42. In turn, the base elements 72 and 74 have different thicknesses. This prevents incorrect assembly of the adjustment mechanism 40.

When the singulator 30 is assembled as shown in FIG. 2, the resilient sleeve 54 abuts flange 46, actuating sleeve 60 abuts resilient sleeve 54, and lever 66 is positioned on shaft 42 so that base elements 72 and 74 abut the end 80 of actuating sleeve 60. Base elements 72 and 74 have cam surfaces 82 contoured to have a distance from pin 68 that is at a minimum when lever 66 is approximately at a right angle to the axis of rotation of shaft 42. The cam surfaces 82 increases from that point so that as lever 66 is moved in a counterclockwise fashion as shown in FIG. 2, cam surfaces 82 push actuating sleeve 60 towards the resilient sleeve 54, in turn compressing it against flange 46 and expanding it within bore 44. The resultant expansion of sleeve 54 prevents and resists any rotation of shaft 42. When lever 66 is approximately 90° from the position shown in FIG. 2, flats 84 on cam surfaces 82 cause a detent when the lever 66 is in its locked position where it is extended axially.

As shown particularly in FIG. 4, the actuating sleeve 60 has a plurality of molded indicia 86 to indicate the relative rotational displacement of actuating sleeve 60, and therefore shaft 42, relative to a corresponding molded indicia 88 on housing 12. Thus, an operator is able to determine visually the position of the singulator 30 relative to the seed disk 18.

FIGS. 2-4 show another feature in the form of a detent 47 on flange 46 which receives a metal strap 49 appropriately fixed to housing 12 (not shown in FIGS. 2 and 3). Metal strap 49 is formed to urge a projection 51 into detent 47, when the shaft 42 and actuating sleeve 60 are positioned to have the middle indicia 86 line up with the indicia 88 on housing 12, as shown in FIG. 4. In other positions, the projection 51 rides on the periphery of flange 46. This enables an operator to feel when the adjustment is in a pre-selected position, in this case the midpoint of the range of adjustments.

Figure 5:
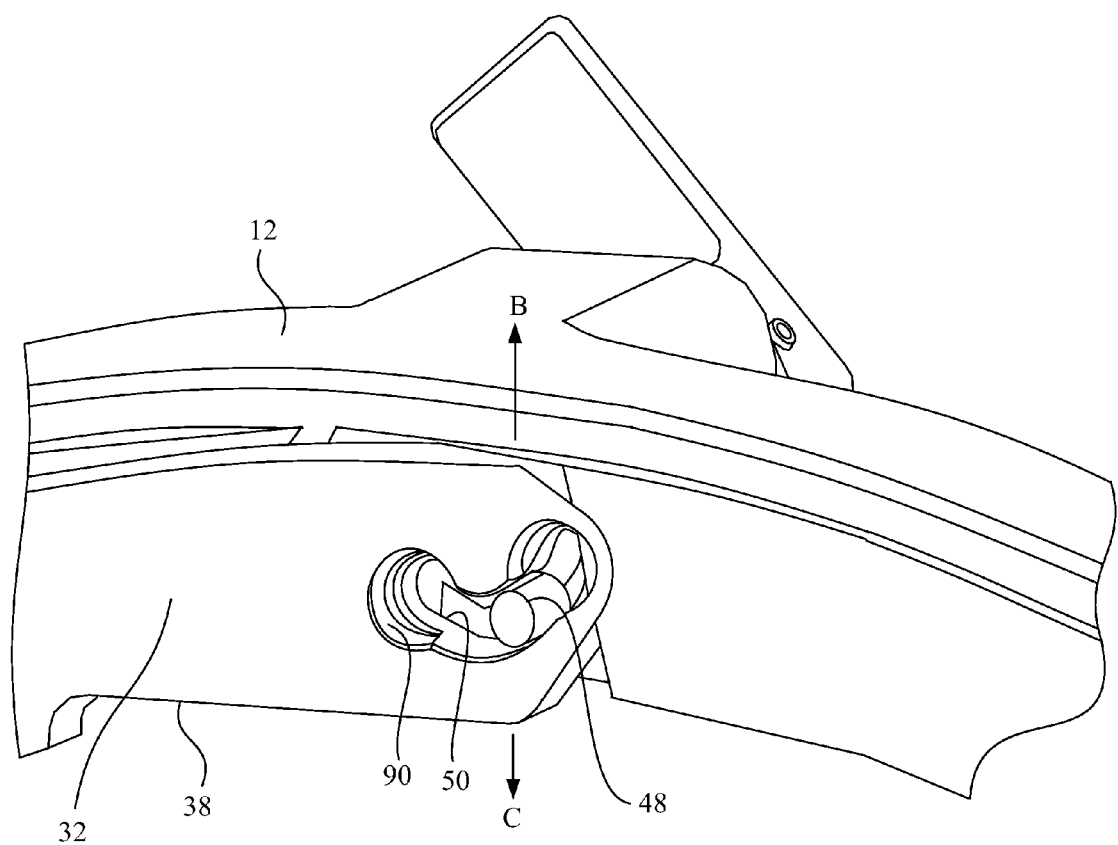
FIG. 5 is a fragmentary exploded view of the singulator of FIGS. 1-5.
Figure 6:
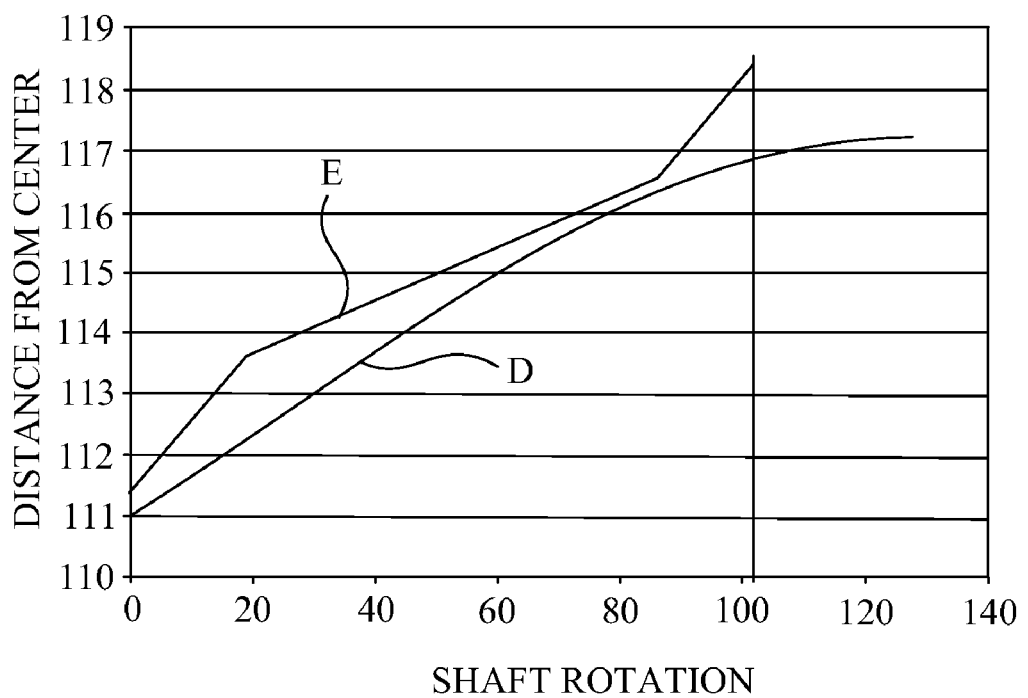
FIG. 6 is a graph showing displacement of the singulator device of FIGS. 1-5 as a function of the rotation of an adjustment handle.

As shown in FIG. 5, the slot 50 in arm 32 has a recess 90 extending around the ends of slot 50 so that any debris trapped within slot 50 will be more easily purged. Furthermore the slot 50, instead of having a straight linear shape relative to the longitudinal dimension of arm 32, has a predetermined, non-linear shape. The shape is in the form of a curve preselected so that the displacement of pin 48 and therefore arm 32 in the direction of the arrows B and C is approximately linear when the arm 32 is being adjusted around a common adjustment point. This is shown in FIG. 6 wherein the distance from the center of the seed disk 18 is shown on the Y axis and the rotation of the shaft 42 in degrees is shown on the X axis. A straight slot configuration is shown as curve D and the movement of the element with slot 50 is shown as curve E. It can be seen that the movement is approximately linear which gives an operator a better feel for the movement of the singulator 30. Furthermore, as shown in FIG. 6, the movement within the range of the seed cell location for a seed corn disk has a lower rise than for a straight slot. Consequently, operator adjustment is becomes finer and more precise.

To adjust the singulator 30, the lever 66 is pivoted to a radial position and it is moved either clockwise or counterclockwise to pivot the shaft 42 to the appropriate location. It should be noted that the lever 66 gives greater leverage than previous serrated knobs used to manipulate the handle. Furthermore, the adjustment mechanism 40 permits an infinite range of rotational positions when compared to the previous step-wise adjustment of prior art designs. In addition, the indicia 86 molded into the actuating sleeve 60 gives a permanent indication of the position of the shaft regardless of dirt accumulation or long term wear.

Having described the preferred embodiment, it will become apparent that various modifications can be made without departing from the scope of the invention as defined in the accompanying claims.

The invention claimed is:

1. Apparatus for setting the position of an arm pivotally mounted about a pivot for knocking off extra seeds from a seed metering disk, said apparatus comprising:
   an arm pivotally mounted for pivotal movement;
   a shaft having an eccentric connection to a location on said arm radially spaced from said pivot point so that rotational displacement of said shaft causes said arm to pivot about said pivot point;
   a lever pivotally mounted to said shaft about an axis approximately at a right angle to the longitudinal axis of said shaft; and
   an element contacting said shaft and connected to said lever, said lever being pivotal between first and second positions, the first acting on said element to permit rotational displacement of said shaft and the second acting on said element to prevent rotational displacement.

2. Apparatus as claimed in claim 1, wherein said lever is in a radial position relative to the longitudinal axis of said shaft for permitting rotational displacement.

3. Apparatus as claimed in claim 2, wherein said lever is in a position where it extends axially when said shaft is prevented from rotational displacement.

4. Apparatus as claimed in claim 1, wherein said element surrounds said shaft.

5. Apparatus as claimed in claim 4, wherein said element is a resilient sleeve.

6. Apparatus as claimed in claim 5, wherein said lever axially compresses said resilient sleeve when said lever is in said second position for expanding said sleeve and preventing rotational displacement of said shaft.

7. Apparatus as claimed in claim 6, wherein said lever has a cam surface urging axial movement away from said lever when said lever is pivoted to said second position.

8. Apparatus as claimed in claim 7, wherein the cam surface on said lever has a flat abutting said actuating sleeve in the second position of said lever.

9. Apparatus as claimed in claim 5, wherein said shaft has a flange and said resilient sleeve is positioned against said flange and said apparatus further comprises an actuating sleeve between said lever and said resilient sleeve.

10. Apparatus as claimed in claim 9, wherein said actuating sleeve has indicia indicating rotational position.

11. Apparatus as claimed in claim 9, wherein said shaft has at least one longitudinally extending flat and said actuating sleeve has a corresponding flat to prevent rotation of said actuating sleeve relative to said shaft.

12. Apparatus as claimed in claim 11, wherein the flat on said shaft is asymmetric with respect to the rotational axis of said shaft.

13. Apparatus as claimed in claim 12, wherein said lever is pivotally mounted on said shaft, the pivotal axis of said lever being generally perpendicular to said flat.

14. Apparatus as claimed in claim 1, wherein said shaft has a pin extending from said shaft and radially spaced from the axis of rotation of said shaft, said arm having a slot receiving said pin.

15. Apparatus as claimed in claim 14, wherein said arm has a recess at least partially surrounding said slot.

16. Apparatus as claimed in claim 14, wherein said slot is nonlinear with respect to the longitudinal axis of said arm.

17. Apparatus as claimed in claim 16, wherein said slot is configured to make the pivoting of said arm approximately linear around a common adjustment position.

18. Apparatus as claimed in claim 17, wherein said slot is configured to minimize the pivotal movement of said arm in response to rotational displacement of said shaft around a common adjustment position.

19. A seeding machine comprising:
   at least one seed metering system, each said seed metering system including:
      a housing;
      a seed disk disposed within said housing, said seed disk including a rotational axis and a plurality of seed cells defining a generally circular path;
      an arm pivotally mounted on said housing about an axis generally parallel to the rotational axis of said seed disk and being positioned closely adjacent said seed cells;
      a shaft journaled about an axis generally parallel to the rotational axis of said seed disk, said shaft having an eccentric connection to said arm at a location spaced from the pivotal axis of said arm;
      a lever pivotally mounted to said shaft about an axis approximately at a right angle to the longitudinal axis of said shaft; and
      an element contacting said shaft and connected to said lever, said lever being pivoted between first and second positions, the first acting on said element to permit rotational displacement of said shaft and the second acting on said element to prevent rotational displacement.

20. A seeding machine as claimed in claim 19, wherein said lever is in a radial position with respect to the shaft for rotational displacement of said shaft when said lever is in said first position.

21. A seeding machine as claimed in claim 20, wherein said lever extends axially relative to the longitudinal axis of said shaft where said shaft is prevented from rotational displacement in the position.

22. A seeding machine as claimed in claim 19, wherein said shaft is received within a bore in said housing and said element surrounds said shaft and is between the bore in said housing and said shaft.

23. A seeding machine as claimed in claim 22, wherein said element comprises a resilient sleeve.

24. A seeding machine as claimed in claim 23, wherein said lever axially compresses said resilient sleeve in said second position.

25. A seeding machine as claimed in claim 23, wherein said shaft has a flange and said resilient sleeve abuts said flange, said seeding machine further comprising an actuating sleeve between said lever and said resilient sleeve.

26. A seeding machine as claimed in claim 25, wherein said actuating sleeve has rotational position indicia matching cooperating with a mark on said housing.

27. A seeding machine as claimed in claim 25, wherein said shaft has a flat extending longitudinally and said actuating sleeve has a flat corresponding to the flat on said shaft for preventing relative rotational movement.

28. A seeding machine as claimed in claim 27, wherein the flat on said shaft is asymmetric with respect to the rotational axis of said shaft.

29. A seeding machine as claimed in claim 28, wherein said lever is pivotally mounted on said shaft with the pivotal axis of said lever being generally perpendicular to said flat.

30. A seeding machine as claimed in claim 25, wherein said lever has a cam surface urging axial movement away from said lever when said lever is pivoted to said second position.

31. A seeding machine as claimed in claim 30, wherein said lever has a flat on the cam surface abutting said adjusting sleeve when said lever is in said second position.

32. A seeding machine as claimed in claim 25, wherein said flange has a detent on its periphery and said seeding machine further comprises a projection yeildably urged into said detent for a pre-selected rotational position of said shaft.

33. A seeding machine as claimed in claim 32 wherein said pre-selected position is approximately the midpoint of the range of adjustments.

34. A seeding machine as claimed in claim 23, wherein said shaft has an annular ridge compressing said resilient sleeve outward to provide drag when the rotational position of said shaft is being adjusted.

35. A seeding machine as claimed in claim 19, wherein said shaft has a crank arm and a pin extending through a slot in said arm.

36. A seeding machine as claimed in claim 35, wherein said arm has a recess surrounding said slot.

37. A seeding machine as claimed in claim 35, wherein said slot is nonlinear with respect to the longitudinal axis of said arm.

38. A seeding machine as claimed in claim 37, wherein said slot is configured to make the pivoting of said arm approximately linear around a common adjustment position.

39. A seeding machine as claimed in claim 38, wherein said slot is configured to minimize the pivotal movement of said arm in response to rotational displacement of said shaft around a common adjustment position.

* * * * *